US008376376B2

(12) United States Patent
Thibault

(10) Patent No.: US 8,376,376 B2
(45) Date of Patent: Feb. 19, 2013

(54) WHEELED CONTAINER PLATFORM FOR A SINGLE BUCKET

(76) Inventor: Richard R. Thibault, Shelby Township, MI (US)

( * ) Notice: Subject to any disclaimer, the term of this patent is extended or adjusted under 35 U.S.C. 154(b) by 631 days.

(21) Appl. No.: 12/481,013

(22) Filed: Jun. 9, 2009

(65) Prior Publication Data

US 2010/0230920 A1 Sep. 16, 2010

Related U.S. Application Data

(60) Provisional application No. 61/059,930, filed on Jun. 9, 2008.

(51) Int. Cl.
*B62B 5/00* (2006.01)

(52) U.S. Cl. .................................... 280/79.5; 280/79.11

(58) Field of Classification Search ............... 280/79.11, 280/79.2, 79.5, 79.6, 79.7
See application file for complete search history.

(56) References Cited

U.S. PATENT DOCUMENTS

| | | | | | |
|---|---|---|---|---|---|
| 422,729 | A | | 3/1890 | Clark | |
| 630,734 | A | * | 8/1899 | Oothout | 248/154 |
| 1,328,458 | A | * | 1/1920 | Schiek et al. | 248/129 |
| 1,628,722 | A | | 12/1925 | Haertel | |
| 2,308,180 | A | * | 1/1943 | Larsen et al. | 248/238 |
| 2,321,981 | A | | 6/1943 | Bowers | |
| 2,424,644 | A | | 7/1947 | Barrett | |
| 2,531,131 | A | | 11/1950 | Johnson | |
| 2,573,085 | A | | 10/1951 | Yonkers | |
| 2,665,922 | A | | 1/1954 | Bard | |
| 2,707,351 | A | | 5/1955 | Walker | |
| 2,772,889 | A | | 12/1956 | Reynolds | |
| 2,917,769 | A | | 12/1959 | Kasper | |
| 2,923,416 | A | * | 2/1960 | Vogel | 211/85.19 |
| 2,947,548 | A | * | 8/1960 | Bard | 280/79.2 |
| 3,013,807 | A | * | 12/1961 | Winterhoff | 15/246.4 |
| 3,031,207 | A | * | 4/1962 | Bard | 280/460.1 |
| 3,554,573 | A | | 1/1971 | Miller | |
| 3,734,527 | A | | 5/1973 | Bard | |
| 3,845,968 | A | | 11/1974 | Larson | |
| 3,996,950 | A | * | 12/1976 | Mier | 135/66 |
| 4,071,163 | A | * | 1/1978 | Martin | 220/630 |
| 4,167,271 | A | * | 9/1979 | Jorgensen | 280/79.5 |
| 4,294,374 | A | | 10/1981 | Ames | |
| 4,313,612 | A | * | 2/1982 | Rubens | 280/79.5 |
| 4,475,660 | A | | 10/1984 | Cain | |
| 4,488,733 | A | * | 12/1984 | Hellsten | 280/47.16 |

(Continued)

*Primary Examiner* — John R Olszewski
*Assistant Examiner* — Jacob Meyer
(74) *Attorney, Agent, or Firm* — Dobrusin & Thennisch PC

(57) ABSTRACT

The invention is a wheeled platform adapted to accommodate at least one five gallon bucket surrounded by a plurality of storage compartments for use by a tradesman such as a dry-wall installer, tile installer, auto detailer, and the like. The wheeled platform includes a rigid base, having a lower and an upper surface structurally interconnected by a plurality of structural ribs and flanges. The flanges extend upward from the upper surface of the base to define a plurality of compartments which are intended to be used to store materials and tools used by the tradesman in the performance of their work. The platform base and flange arrangement define at least one cylindrical compartment for receiving a five gallon bucket. Four caster wheels are appropriately attached to the lower surface of the base so that the platform can be wheeled from a service vehicle to a specific job site having stored therein, the tradesman's tools, as well as necessary material supplies to perform daily job functions. A retainer arrangement is provided on either side of the bucket to create a biasing force to secure the bucket within the compartment of the wheeled platform. The retainer arrangement permits the bucket to be lifted by its handle so that the bucket and platform base secured thereto can be conveniently lifted over uneven terrain or up and down steps.

8 Claims, 5 Drawing Sheets

U.S. PATENT DOCUMENTS 4,775,067 A 10/1988 Mount
4,799,699 A 1/1989 Berfield et al.
4,861,050 A * 8/1989 Bergeron .................. 280/47.35
4,908,904 A 3/1990 Smith, Jr.
4,993,726 A 2/1991 Schumacher et al.
5,040,808 A * 8/1991 McIntyre .................. 280/47.19
5,046,749 A 9/1991 Owens
5,074,572 A 12/1991 Delmerico et al.
5,088,751 A 2/1992 Zint
5,110,147 A * 5/1992 Gershman .................. 280/79.5
5,123,667 A 6/1992 Stolzman
5,163,695 A * 11/1992 Pakowsky .................. 280/79.7
5,183,280 A * 2/1993 Gresch .................. 280/79.5
5,207,345 A 5/1993 Stewart et al.
5,253,887 A * 10/1993 Marenger .................. 280/79.3
5,253,972 A * 10/1993 Drew et al. .................. 414/469
5,380,033 A 1/1995 Harling
5,433,463 A 7/1995 Finley
5,472,220 A 12/1995 Stephan
5,492,346 A * 2/1996 Stadler et al. .................. 280/47.19
5,575,490 A 11/1996 Simpson, Jr.
5,713,583 A 2/1998 Hansen
5,806,867 A * 9/1998 Hampton .................. 280/47.34
5,860,659 A 1/1999 Hart
5,897,018 A * 4/1999 Pruitt .................. 220/603
5,971,333 A 10/1999 Fiedor
6,027,128 A * 2/2000 Stich et al. .................. 280/47.16
6,053,516 A 4/2000 Ottaway
6,135,467 A * 10/2000 Tagariello .................. 280/79.5
6,170,118 B1 * 1/2001 McIntyre et al. .................. 15/327.6
6,176,500 B1 * 1/2001 Clement et al. .................. 280/79.5
6,179,306 B1 1/2001 Maxwell
6,209,891 B1 * 4/2001 Herrmann .................. 280/32.6
RE37,350 E * 9/2001 Stephan .................. 280/79.5
6,315,310 B1 * 11/2001 Hurt .................. 280/79.5
6,386,557 B1 5/2002 Weldon
6,419,246 B1 * 7/2002 Neal .................. 280/79.5
6,488,293 B1 12/2002 Mitchell et al.
6,520,609 B1 2/2003 Beauregard et al.
6,698,771 B1 * 3/2004 Bergeron .................. 280/47.35
6,729,631 B2 * 5/2004 Trine et al. .................. 280/79.5
6,733,017 B2 * 5/2004 Intravatola .................. 280/79.6
6,742,747 B1 * 6/2004 Timmons, Jr. .................. 248/139
6,779,225 B1 8/2004 Bellarosa, III
6,815,036 B1 * 11/2004 Romero .................. 428/99
6,827,357 B2 * 12/2004 Calmeise et al. .................. 280/47.34
6,851,566 B1 * 2/2005 Bonner .................. 220/4.27
6,964,423 B1 * 11/2005 Chieh et al. .................. 280/79.11
7,273,216 B1 * 9/2007 Hohrman .................. 280/79.5
7,325,814 B2 * 2/2008 Sparacino .................. 280/47.131
7,357,398 B2 * 4/2008 O'Connor .................. 280/47.34
7,360,284 B1 * 4/2008 Viani .................. 24/302
7,364,172 B1 * 4/2008 Archer .................. 280/79.5
7,419,169 B2 * 9/2008 Intravatola .................. 280/79.6
7,427,076 B2 * 9/2008 Gwin .................. 280/79.2
7,661,685 B2 * 2/2010 Thibault .................. 280/47.35
7,823,907 B1 * 11/2010 Coholan .................. 280/652
7,845,656 B2 * 12/2010 Thompson .................. 280/79.5
7,857,328 B1 * 12/2010 Boss .................. 280/47.25
7,887,016 B2 * 2/2011 Gunsaullus .................. 248/238
7,917,992 B2 * 4/2011 McIntyre .................. 15/327.1
7,942,429 B2 * 5/2011 Hill .................. 280/47.26
8,087,678 B2 * 1/2012 Nowak .................. 280/35
2002/0112309 A1 * 8/2002 Rougeau .................. 15/257.06
2003/0020261 A1 * 1/2003 Perelli et al. .................. 280/651
2003/0052465 A1 * 3/2003 Ahmed et al. .................. 280/79.5
2003/0102644 A1 * 6/2003 Figueroa .................. 280/47.35
2003/0213090 A1 * 11/2003 Holsten et al. .................. 15/323
2004/0099703 A1 * 5/2004 Schoenberger .................. 224/401
2004/0104550 A1 * 6/2004 Do .................. 280/47.26
2004/0145139 A1 * 7/2004 Kershaw .................. 280/79.5
2004/0183268 A1 * 9/2004 Hartsock .................. 280/79.5
2004/0245735 A1 * 12/2004 Pins .................. 280/79.5
2004/0245736 A1 * 12/2004 Intravatola .................. 280/79.6
2006/0157946 A1 * 7/2006 Stuemke .................. 280/79.5
2006/0186000 A1 * 8/2006 Gregory et al. .................. 206/315.9
2006/0214384 A1 * 9/2006 Gwin .................. 280/79.5
2007/0096413 A1 * 5/2007 Staracino .................. 280/47.26
2007/0226945 A1 * 10/2007 McIntyre .................. 15/327.6
2008/0197587 A1 * 8/2008 Nowak .................. 280/30
2008/0223071 A1 * 9/2008 Vanderberg et al. .................. 62/457.7
2008/0272566 A1 * 11/2008 Thompson .................. 280/79.5
2009/0050761 A1 * 2/2009 Gunsaullus .................. 248/242
2009/0294322 A1 * 12/2009 Baltz .................. 206/519
2010/0154464 A1 * 6/2010 Vanderberg et al. .................. 62/457.7
2010/0224699 A1 * 9/2010 Gaddis et al. .................. 239/146
2010/0320709 A1 * 12/2010 Williamson .................. 280/47.3

* cited by examiner

WHEELED CONTAINER PLATFORM FOR A SINGLE BUCKET

CROSS-REFERENCE TO RELATED APPLICATIONS

This application is a continuation-in-part of U.S. Provisional Patent Application No. 61/059,930 filed on Jun. 9, 2008.

FEDERALLY SPONSORED RESEARCH OF DEVELOPMENT

Not Applicable.

REFERENCE TO SEQUENCE LISTING

Not Applicable.

BACKGROUND OF THE INVENTION

1. Field of the Invention

The present invention relates to a wheeled platform for a container which is adapted to provide a centrally located compartment for receiving a five gallon bucket surrounded by a plurality of peripheral compartments located on the platform for further storage utility and easy, convenient access to the user of the wheeled platform.

2. Description of Related Art

The use of bucket containers for transporting tools, gardening implements, or more generally for carrying materials in vehicles, boating activities or home work performing activities is well known in the prior art. The prior art is replete with a myriad of special purpose designs developed for specific objectives and requirements. For example, Schiek, U.S. Pat. No. 1,328,458, discloses a bucket in which the bottom is so constructed that a base normally forming a part of the bucket may be quickly disconnected from the bucket bottom when the occasion requires and when connected therewith will enable the bucket to be slid easily and noiselessly, from point to point, over a supporting surface without injury to the bucket bottom. In Bowers, U.S. Pat. No. 2,321,981, there is disclosed a scrub bucket assembly consisting of a mobile base which serves as a support for a frame, which is adapted to receive a pair of bucket-like receptacles, one adapted to contain soap suds to be used in scrubbing floors, walls, windows, and the like, and the other receptacles adapted to contain clear rinsing water.

Reynolds, U.S. Pat. No. 2,772,889, discloses a wheeled support for containers having a bottom flange thereon. The wheeled carrier is adjustable to adapt to various diameters of containers and provides a clamping means along the outer periphery thereof so as to grip a downwardly projecting flange on the bottom of the container. Bard, U.S. Pat. No. 2,947,548, discloses a wheeled bucket used in floor cleaning operations having a resilient bumper assembly installed along the lower periphery so as to prevent damage to the bucket or furniture which it may bump into.

Hampton, U.S. Pat. No. 5,806,867, discloses a bucket trolley having a resilient engaging wall for retaining a standard size bucket containing a load. The trolley includes a set of wheels and an interchangeable handle. The bucket is retained by the resilient engaging wall such that the trolley is lifted along with the bucket for moving up and down stairs. Stephan, U.S. Pat. No. 5,472,220, discloses a dolly with an upwardly extending edge that conforms to the size of a standard five gallon bucket. The upstanding edge on the dolly prevents the bucket from tipping as it is pushed or pulled around the worksite. The upstanding edge also contains tightening means in the form of thumb screws at 90° circumferentially spaced intervals, which are hand tightened to prevent the bucket from tipping. Finally, Tagariello, U.S. Pat. No. 6,135,467, discloses a bucket stand which includes a base and at least one receptacle extending generally vertically, provided for storage of elongated items. The stand includes clamp means to secure the bucket or pail to the base with an interference fit. The base includes circumferentially spaced struts connected to the ring base which clamps the bucket. Receptacles, connected to the ring base by the struts, are provided to provide storage of elongated items.

Although these various prior art bucket stands or dollies solve some of the shortcomings of the prior art, many provide solutions to single problems identified with the use of prior art bucket stands or dollies. Therefore, what is needed is a wheeled container platform that does not waste material by using deep wells high lips, or expanded peripheral envelope to prevent the bucket from tipping; does not require the time consuming effort of having to loosen screws or thumb screws in order to secure or remove the bucket to or from the platform; is cost effective, easy to manufacture and ergonomically stable in all of its various uses; is convenient to use by providing additional storage receptacles which are conveniently accessible to the user while being easily moved about the worksite without concern of the wheeled platform and associated bucket tipping over.

BRIEF DESCRIPTION OF THE INVENTION

The invention is a wheeled platform for a container adapted to have a bucket mounted thereon that avoids all of the shortcomings of the prior art. Specifically, the invention is a wheeled platform for material handling which is particularly useful for tradesmen, repairmen, home handymen, or car detailers which is not anticipated or rendered obvious or even implied by any of the known prior art, considered by itself or in combination.

The present invention consists of a wheeled platform base molded from a high density polyethylene plastic material and having a plurality of upstanding flanges molded therein to define several compartments in combination with a centrally disposed cylindrical compartment adapted to receive a conventional cylindrically shaped five gallon bucket. The five gallon bucket may serve different purposes depending on the user of the wheeled platform. For the tradesman, the bucket may contain an assortment of tools or materials such as paint, tile cement, drywall joint compound or a sealer used in conjunction with the type of work to be performed. For example, a painter, with the use of a form fit throwaway liner that conforms to the bucket and a standard paint roller, can use the invention to perform his work having continuous, ergonomically easy access to the paint and the wheeled platform providing mobility to move the bucket of paint about the worksite. A drywall finisher or tile installer that uses the wheeled platform of the invention to store a bucket of drywall joint compound or tile cement has complete mobility during the course of the job activity since the wheeled platform lends itself to be easily moved about the worksite with little effort. It is no longer necessary for the tradesman to carry the bucket with the material therein to or from, as well as about the worksite since the bucket is completely mobile and is moveable with the simple touch and light pressure exerted by the hand.

The base platform also includes a plurality of compartments surrounding the centrally disposed bucket compartment. These compartments are defined by integrally molding upright flanges to the base. The compartments are configured to provide storage for tools and/or materials which may be required for specific applications. For example, a contractor's wheeled platform may include of one or two large storage compartments for miscellaneous tools or supplies to be stored whereof use may be required frequently while performing the specific work function. Other units may have a plurality of compartments surrounding the centrally disposed bucket compartment to enable storage of accessory containers of cleaners, spot removers, etc., for example, which may be used in the process of washing a passenger car or RV vehicle. Still other applications combine the wheeled platform with specific accessories which are conveniently stored surrounding the bucket as required for specific applications.

The platform base is supported by four wheels mounted to the bottom of the base member of the wheeled platform to provide the mobility to allow the wheeled platform to be conveniently moved from one worksite to another or from the tradesman's vehicle to and about the worksite. Two of these wheels have lockable mechanisms so that when using the wheeled platform on an inclined surface, such as a driveway, these two wheels of the platform can be easily locked to maintain the unit in a specified place. For an ice fisherman, the four wheels are easily removed and replaced with small skis so as to allow the platform base and associated bucket to be easily conveyed across ice or snow.

The wheeled platform has an additional feature to provide additional utility to the bucket arrangement during use in the many applications conceivable by the user. At approximately 180° apart, locations about the circumference of the upstanding flange that defines the centrally disposed cylindrical bucket compartment is an integrally molded upwardly and radially extending housing frame consisting of four walls in which one end of a bungee cord is mounted with the use of a locator pin. The opposite end of the resilient bungee cord is attached to the bucket near the top rim of the bucket. By securely attaching the bucket to the wheeled platform with the use of an S-hook in combination with a bungee cord, the handle of the bucket can now be used as a convenient means of lifting the wheeled platform with the bucket mounted thereon to move the entire combined unit from different horizontal levels, across interruptions in the surface upon which the combined unit is placed when it cannot be conveyed by its wheels or over uneven terrains around the worksite.

The primary object of the invention is to provide a wheeled platform adapted to receive a standard five gallon bucket for use by tradesman, homeowners, gardeners, or car detailers as an ergonomically convenient material handling device to use in a variety of applications wherein tools and/or material supplies may be conveyed to and from the worksite as well as conveniently used at the worksite while performing the work function. Additionally, it is an object that the wheeled platform and associated bucket provide maximum flexibility while in use by furnishing significant degrees of freedom of motions and mobility with the bucket being transferable on the wheeled platform or alternatively transporting the wheeled platform and bucket as a single unit from one level to another by carrying the platform through the use of the handle on the bucket and the bungee cords secured between the platform and the bucket. Additionally, the bucket is readily storable on the platform and can easily be removed therefrom by unhooking the bungee cords.

A further object of the invention is to provide an improved wheeled platform for conveniently and reliably retaining a standard five gallon bucket on the wheeled platform, with the combination further providing a convenient means for alternate ways of providing a material handling device for carrying tools and/or material supplies, as well as for storing the same, so as to be ergonomically accessible to the user while performing the job function. The combination may be used for carrying hand tools, power tools and/or material supplies to and from the worksite and for maintaining such in an orderly fashion as well as to provide easy, convenient access during the performance of the job function.

It is a further object of the invention to provide a combination wheeled platform and related bucket which is simple and of sturdy construction while also being lightweight and easy to transport to and from as well as about a worksite.

It is still a further object of the invention to provide a combination bucket and platform dolly for performing a variety of tradesman's and homeowner's tasks in which tools and material supplies can be stored and transported such that these tools and materials are readily accessible by the user during the performance of the specific tasks.

Other advantages and features of the present invention will become more apparent from the following detailed description when read in conjunction with the accompanying drawings and claims.

DETAILED DESCRIPTION OF THE PREFERRED EMBODIMENT

Figure 1:
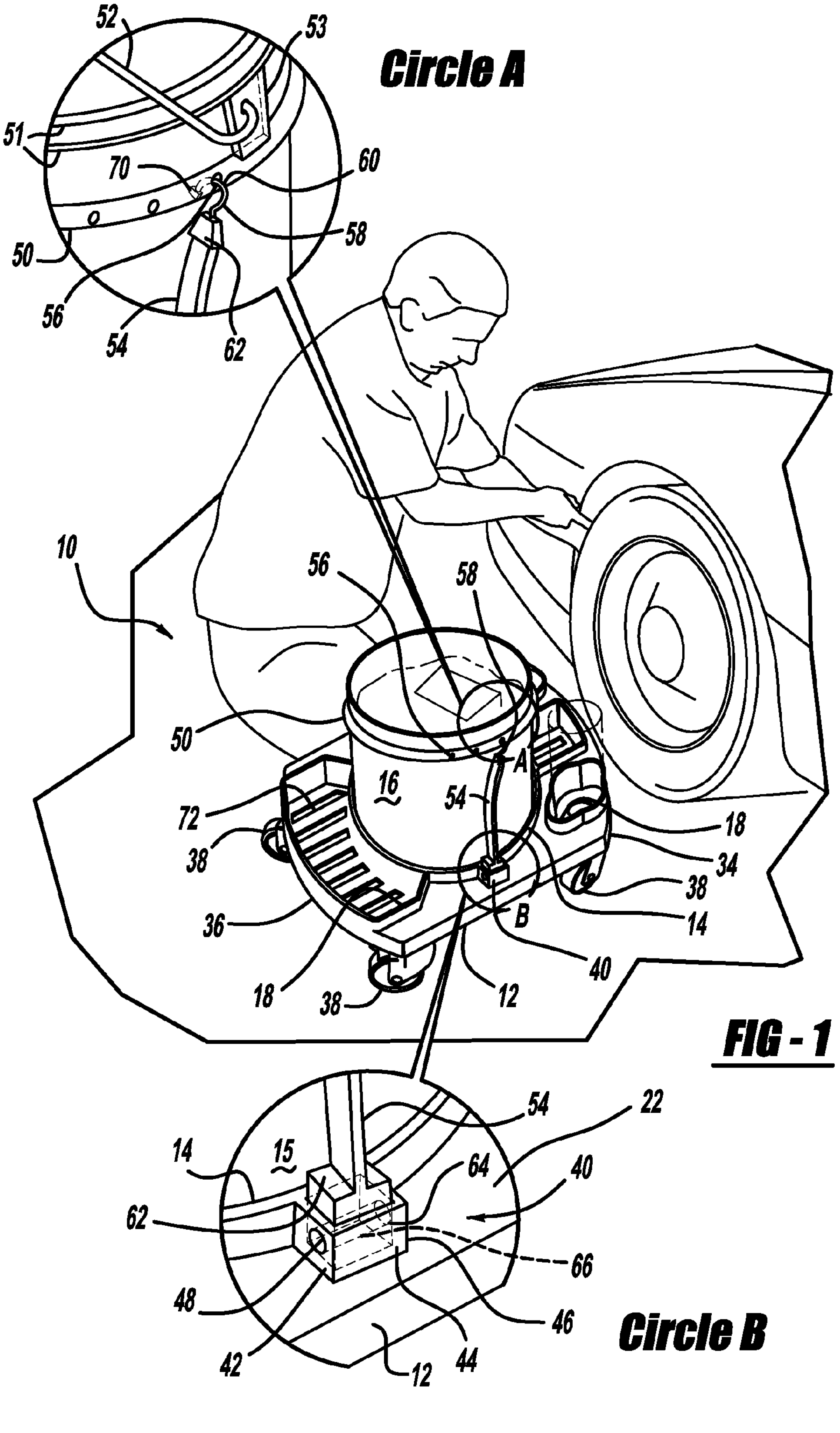
FIG. 1 is a perspective drawing of the invention used by a homeowner for detailing his automobile.

Referring now to the drawings, in particular FIGS. 1-5, a first preferred embodiment of the wheeled platform dolly 10 of the present invention is shown therein. The embodiment is equipped with storage compartments surrounding a centrally disposed cylindrical compartment which is sized to receive a cylindrically shaped five gallon bucket. The wheeled platform base 12 is molded from a high density polyethylene plastic material having a centrally spaced upstanding cylindrical flange 14 molded therein for receiving the five gallon bucket 16. Although the preferred embodiment discloses the use of a cylindrical bucket, the peripheral shape or configuration of the bucket may be of any shape. Therefore, the upstanding cylindrical flange can also be of any convenient shape complimentary to the peripheral shape of the bucket container. Surrounding the cylindrical flange 14 is a plurality of upstanding flanges defining several different sized compartments 18 which are molded specifically to receive miscellaneous containers of various shapes and sizes which would typically be used in conjunction with the task at hand. For example, for car detailers, various types of spot and grease removers or polish containers may be stored in the compartments surrounding the centrally located cylindrical flange so as to be conveniently accessible to the car detailer. Further, the larger compartments can be used to store sponges, rags, small cleaning brushes or pliable tubes containing lubricants or cleaning products.

Figure 6:
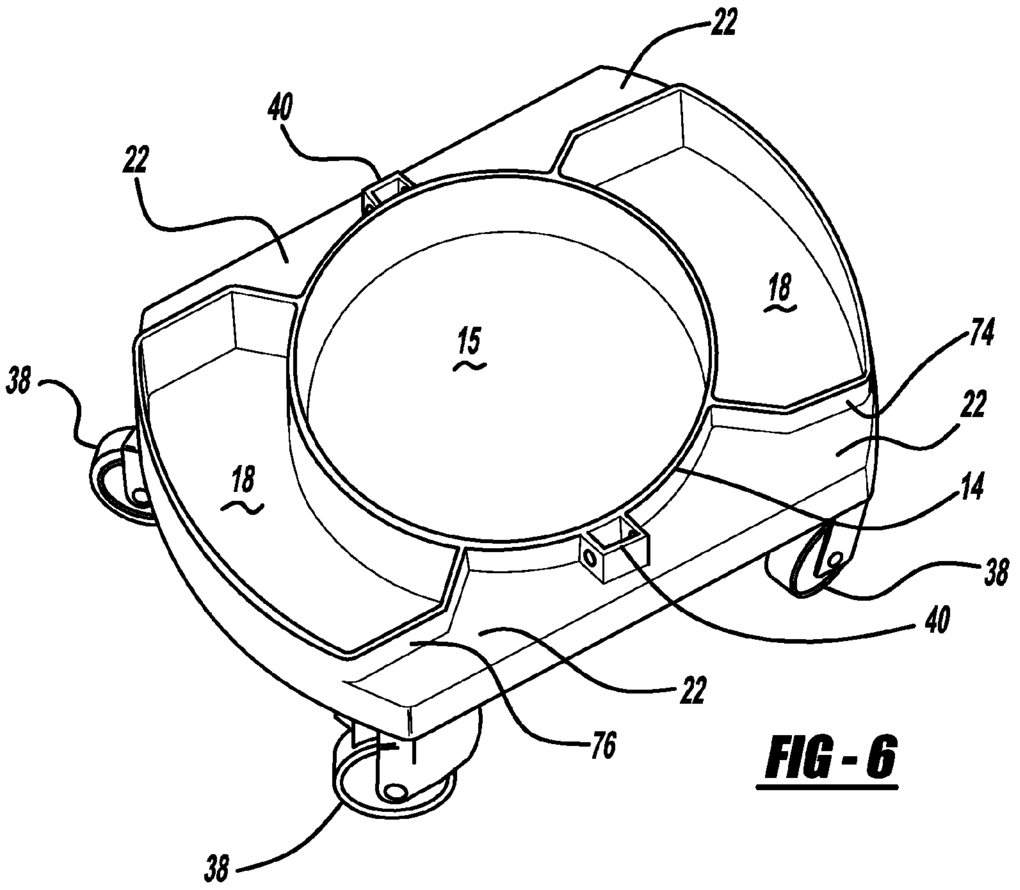
FIG. 6 is a perspective view of an alternate embodiment of the invention.

To provide the structural integrity for the weight of the five gallon bucket container as well as the several conveniently disposed container compartments surrounding the bucket, the underside of the base is adequately ribbed 20 between the upper 22 and lower 24 surfaces of the wheeled platform base 12 to avoid any deflection of either the upper 22 or lower surface 24 of the wheeled platform base 12. The flanges for each of the compartments 26, 28, 30, 32 surrounding the centrally disposed compartment 15, including the cylindrical flange 14 that defines the centrally disposed compartment 15, extend above the top or surface 22 of the wheeled base platform 12 to provide adequate stability to the containers intended to be stored in each of these compartments. Each of the compartments have a floor or bottom surface 33 which may be solid as shown in FIG. 6 or alternatively each compartment floor 33 may have designated openings 72 therein for drainage purposes as is disclosed hereinafter.

The respective ends 34, 36 of the wheeled platform dolly 10 have been rounded off to avoid the use of sharp corners along the sidewall of the base platform. Sharp corners are avoided to prevent the wheeled platform dolly 10 from catching onto another sharp corner as the wheeled platform is moved about the worksite.

Four caster wheels 38 are attached to the lower surface 24 of the wheeled platform base 12 proximate the four corners thereof. The caster wheels 38 are alike and have respective ground engaging surfaces extending a distance from the bottom surface of the wheeled platform base 12 so as to be generally co-planar with one another. Each caster wheel 38 is adapted to swivel and permit rotational motion, as well as longitudinal movement of the wheeled platform base 12. Alternatively, it is conceivable to use a straight through independent axle (not shown) on one of the sets of caster wheels while only caster wheels are used on the other set of wheels of the wheeled platform base 12. Such arrangement will permit uni-directional or 360° rotation of each caster wheel 38 on the plane of contact with the ground surface. Alternatively, the caster wheels 38 may be mounted on a single axle which runs parallel to the ground from one side of the wheeled platform to the opposite side thereof. Preferably, however, the configuration shown in the figures commonly known as a caster wheel assembly is preferred.

To maintain the wheeled platform dolly 10 in position on an uneven or inclined terrain, it is foreseeable that caster wheels with an individual locking mechanism (not shown) be used so as to keep the wheeled platform in place by locking at least two of the caster wheels of the assembly.

A common problem of prior art single bucket carriers is the instability of the carrier when the bucket 16 is filled with water or a heavy material compound such as tile cement. Accordingly, prior art devices are known to place the wheels as far apart as possible or use additional supporting structure on the bucket dolly to securely hold the bucket to the dolly to prevent it from tipping over. Such arrangements are more expensive and present a larger overall envelope than what is necessary with the current invention.

As shown in detail circle B of FIG. 1, the present invention utilizes a simple solution to such a problem by providing two small upright housing frames 40 molded into the top surface 22 of the wheeled platform base 12 at approximately 180° apart locations and integral with the upstanding flange 14 for the centrally located cylindrical compartment 15 into which the bucket 16 is placed. Each housing frame 40 consists of three upstanding walls 42, 44, 46 integrally molded with the cylindrical flange 14 surrounding the bucket compartment 15 and with the top surface 22 of the wheeled platform base 12. The walls 42, 46 that are oriented approximately radially extending from the cylindrical flange have at their center a small aperture 48 to accommodate a small push pin as will be discussed hereinafter.

As shown in detail circle A of FIG. 1, the typical five gallon bucket 16 is molded with a concentric radially extending downwardly projecting skirt 50 and a plurality of reinforcement collars 51 integral with the outside diameter of the five gallon bucket 16. Between the skirt 50 and the reinforcement collars 51, there is generally an outward projection 53 in the wall, which is integrally molded with the skirt 50 at opposing 180° apart circumferential segments. At these two locations, the handle 52 of the bucket 16 is secured to the sidewall of the bucket 16. The skirt 50 and reinforcement collars 51 arrangement as well as the outward projection 53 provide the structural integrity for the bucket walls to prevent them from radially deflecting when there is a significant weight of material content in the bucket, i.e. water, sand, slag, tile cement, drywall compound, and the like. This skirt 50 is also used to provide a point of attachment for a biasing member or bungee cord 54 as shown in FIG. 1 and circle A so that the bucket 16 and wheeled platform base 12 can be secured together as a unit. The attachment point consists of a small hole 56 that is drilled in the upper part of the top ledge of the skirt 50 as shown in FIG. 1. A link member 58 having one end terminating in a 180° reverse bend hook 60 is installed into one end of an EPDM rubber strap coupling member or bungee cord 54 having terminal ends 62 of a rectangular enlarged end portion with a hole 64 provided centrally therethrough. The reverse bend hook 60 is installed onto one end of the EPDM rubber strap while the opposite end of the bungee cord 54 is mounted in the respective housing frame 40 molded to the top surface 22 of the base 12 of the wheeled platform. A push pin 66 is placed through the hole 48 of each radially extending wall 42, 46 of the housing frame 40, as well as through the hole 64 of the rectangular enlarged terminal end portion 62 at one end of the bungee cord 54 to secure one end of the bungee cord to the base 12 of the wheeled platform.

The opposite end of the link member 58 is provided with a reverse bend hook 60 also, but of a larger radius, so that the two ends of the link member 58 face each other but are also offset from one another. Further, the end of the reverse bend hook 60 of the opposite end of the link member 58 has an additional offset which is created by a bend of the end in the outward direction. To the terminating end of the outward bend of the link member 58 is mounted an axle cap nut 70 which is retained to the end of the link member by the interference fingers of the axle cap nut 70.

With one end of the bungee strap 54 secured into the housing frame 40 on the top surface 22 of the base 12 on both sides of the wheeled platform, the bungee cords 54 are each resiliently extended and the end of the link member 58 is placed in the small hole 56 that is drilled into the upper part of the top ledge of the skirt 50 of the bucket wall along each side of the bucket 16 following by mounting the axle cap 70 on the end to secure the end to the bucket. With a bungee cord 54 that is properly sized to the distance between the base 12 of the wheeled platform and the hole 56 in the skirt 50 of the bucket wall, a holding force is applied by the resiliency of the bungee cord 54 so that the bungee cord 54, as so installed, will prevent the bucket from being unstable when filled with a heavy load such as sand, water, cement, or dry wall spackling compound. Also when it is necessary to lift the wheeled platform dolly 10 for any reason, the handle 52 of the bucket 16 can now be used to lift the bucket 16 and the wheeled platform dolly 10 will lift with the bucket 16 so that the complete assembly can be carried up the stairs, over an impediment, or over uneven terrain, etc. The through holes 72 in the lower surface of the wheeled platform base 12 are for purposes of drainage so as to prevent build up of any spilled material from the bucket 16 in the compartments 15, 26, 28, 30, 32.

With reference to FIG. 6, there is shown another embodiment of the wheeled platform. This alternate embodiment provides two large compartments 18 surrounding the centrally disposed cylindrical compartment 15 which holds the five gallon bucket 16.

This arrangement is more for a general purpose dolly for a contractor than a specific use application. Like the preferred embodiment, flanges 74, 76 are integrally molded to the upper surface 22 of the wheeled platform base 12 to define a centrally disposed compartment 15 sized to contain a five gallon bucket 16 with two large surrounding compartments 18 for containing selective material used in conjunction with the work to be performed. For example, plumbers would use such dolly to transport pipe, fixtures, valves, miscellaneous plumbing appurtenances as well as the heavier plumbing tools, i.e. pipe wrenches, piper cutters, etc., while the various smaller tools and associated materials, i.e. soldering gun, solder, pipe compound, and small hand tools can be carried in the two compartments surrounding the centrally located five gallon bucket 16 compartment.

As in the preferred embodiment, the top surface 22 of the base is provided with integrally molded two small upright housing frames 40 consisting of a four wall structure on either side of the centrally disposed cylindrical flange 14 at approximately 180° apart location in which is mounted one end of a bungee cord 54 as earlier disclosed. The opposite end of the bungee cord 54 is located in the small hole placed in the top ledge of the skirt 50 of the five gallon bucket 16 and the bungee cord 54 length is sized so as to place a downward biasing force on the bucket 16 when each end of the bungee cord 54 is attached to the platform and bucket 16 to provide stability to the bucket 16 and allow the bucket handle 52 to be used to pick up the combined bucket 16 and platform when it is necessary to traverse the wheeled platform and bucket 16 over an uneven terrain or up and down steps or stairs.

Figure 7:
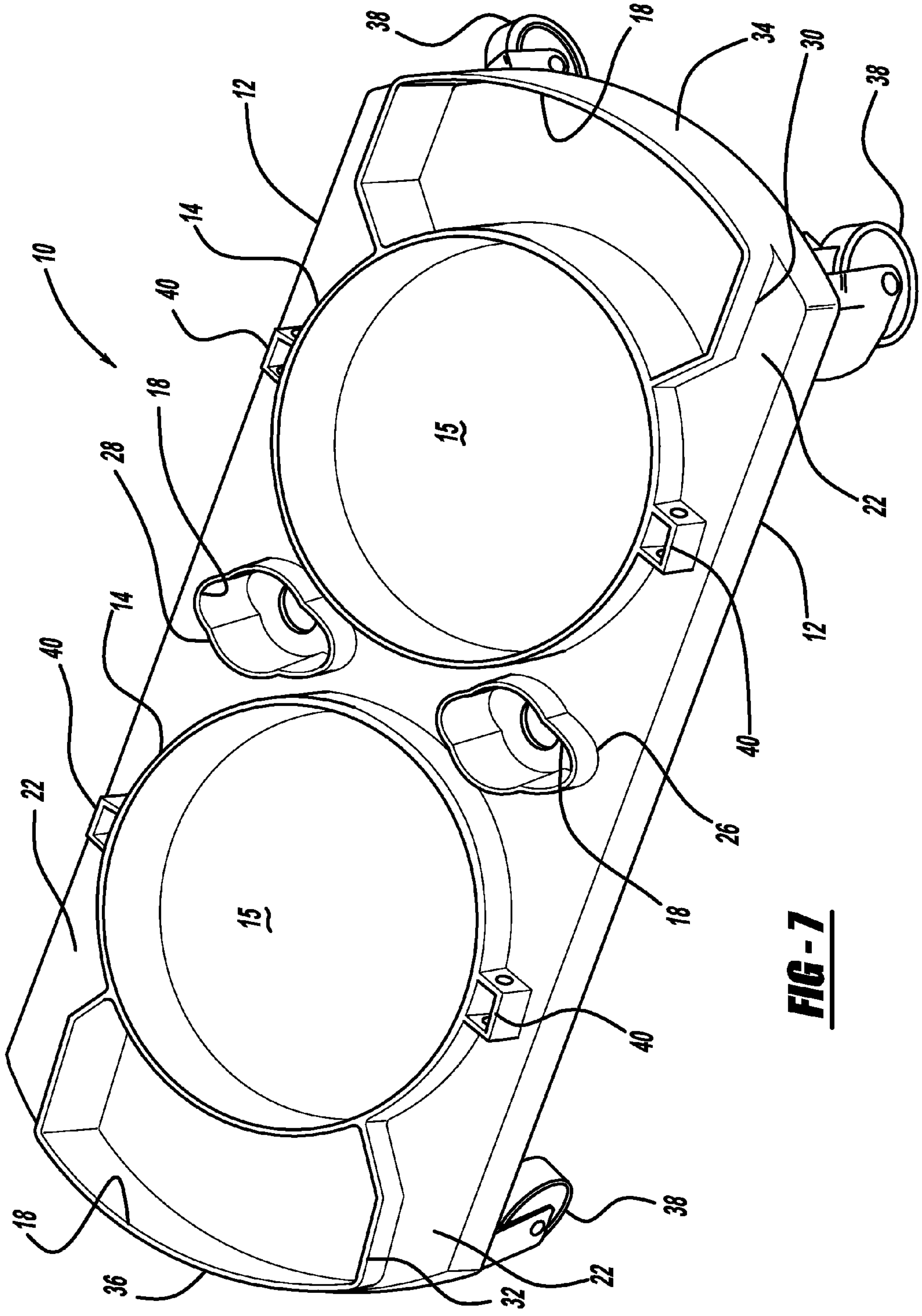
FIG. 7 is a perspective view of another alternative embodiment of the invention.

FIG. 7 illustrates yet another variant of the invention. This embodiment of the wheeled platform dolly 10 is proposed for the car detailer to enable the handling of two five gallon buckets 16 mounted side-by-side on the platform. One bucket is intended to contain soapy water for washing purposes while a second bucket is intended to contain rinse water proposed for rinsing purposes. This embodiment can also be used by a contractor where one bucket contains a material compound associated with the specific work activity, i.e. tile cement, grout, drywall mud, etc., and the second bucket contains some form of cleaner or rinse water to clean the tools related to the job activity.

As earlier disclosed, the double bucket platform shown in FIG. 7, like the preferred embodiment, is made from a high density polyethylene plastic material having a base 12 defined by an upper and lower surface 22, 24 with a specified thickness therebetween. Extending from the upper surface 22 of the base 12 is a pair of cylindrical flanges 14 molded adjacent to each other for receiving a five gallon bucket 16 in each of the pair of cylindrical flanges 14. Surrounding the pair of cylindrical flanges is a plurality of upstanding flanges 18 defining several different storage compartments in the base 12. Each compartment 18 being molded in the base 12 to receive miscellaneous containers of various shapes and sizes to be stored therein and which would most typically be used in conjunction with the specific job to be performed by the contractor. For example, floor installers can use this type of double bucket arrangement to carry a bucket of cement in one bucket compartment while the second compartment can accommodate the new tile material to be stacked thereon so that the installer can conveniently guide the wheeled double bucket about the worksite with the new tile and cement conveniently reachable by hand. The installer's tools can be stored in the compartments surrounding the double bucket arrangement. Drywall installers can use one bucket compartment to store the mud to be applied while the second bucket contains rinse water to keep the tools rinsed and clean. Further, the drywall tape, as well as all of the installer's tools can be easily stored in the surrounding compartments.

To provide the structural integrity for the weight of the five gallon bucket container as well as the several conveniently disposed containers surrounding the bucket, the underside of the base is adequately ribbed 20 between the upper and lower surfaces 22, 24 of the base 12 to avoid any deflection of the lower surface 24 of the base 12. The flanges 18 for each of the compartments surrounding the centrally disposed compartment 15, including the flanges 14 that define the centrally disposed compartment 15, extend above the top surface 22 of the base 12 platform to provide adequate stability to the containers intended to be stored in each of these compartments.

The respective ends 34, 36 of the wheeled platform base 12 have been rounded off to avoid the use of sharp corners along the sidewall of the base platform. Sharp corners are avoided to prevent the wheeled platform from catching onto another sharp corner as the wheeled platform is moved about the worksite.

Six caster wheels 38 are attached to the lower surface 24 of the double bucket wheeled platform. One caster 38 is mounted proximate the four corners thereof while two caster wheels are mounted at the center along opposing sides thereof (not shown). The caster wheels 38 are alike and have respective ground engaging surfaces extending a distance from the bottom surface of the base so as to be generally co-planar with one another. Each caster wheel is adapted to swivel and permit rotational motion, as well as longitudinal movement of the wheeled platform. Alternatively, it is conceivable to use a straight through independent axle (not shown) on one of the sets of wheels while only caster wheels are used on the other set of wheels of the wheeled platform. Such arrangement will permit uni-directional or 360° rotation of each caster wheel on the plane of contact with the ground surface. Alternatively, the caster wheels 38 may be mounted on a single axle which runs parallel to the ground from one side of the wheeled platform to the opposite side thereof. Preferably, however, the configuration shown in the figures commonly known as a caster wheel assembly is preferred.

Like the preferred embodiment, to maintain the wheeled platform in position on an uneven or inclined terrain, it is foreseeable that some of the caster wheels 38 have an individual locking mechanism (not shown) so as to keep the wheeled platform in place by locking at least two of the caster wheels of the assembly.

As earlier discussed, a common problem of prior art bucket carriers is the instability of the carrier when the bucket is filled with water.

Like the preferred embodiment, the double bucket wheeled platform is provided with two small upright housing frames 40 molded into the top surface 22 of the base 12 at approximately 180° apart locations and integral with the top surface 22 of the base 12 and each upstanding flange 14 for the adjacent cylindrical compartment 15 into which each bucket 16 is located. Each housing frame 40 consists of three upstanding walls 42, 44, 46 integrally molded with the cylindrical flange 14 surrounding each bucket compartment and with the top surface 22 of the base as disclosed with respect to the preferred embodiment. The walls 42, 46 that are oriented approximately radially extending from the cylindrical flange 14 have at their center a small aperture to accommodate a small push pin as will be discussed hereinafter.

As hereinabove disclosed, the skirt 50 and reinforcement collars 51 on each of the buckets provide the structural integrity for the bucket 16 walls to prevent them from radially deflecting when there is a significant weight of material content in the bucket, i.e. water, sand, slag, tile cement, drywall compound, and the like. This skirt 50 is also used to provide a point of attachment for a bungee cord 54 so that the bucket 16 and wheeled platform base 12 can be secured together as a unit as heretofore disclosed. The attachment point consists of a small hole 56 that is drilled in the upper part of the top ledge of the skirt 50 as shown in detail circle A of FIG. 1. A link member 58 having one end terminating in a 180° reverse bend hook 60 is installed into one end of an EPDM rubber strap coupling member or bungee strap 54 having terminal ends 62 of a rectangular enlarged end portion with a hole 64 provided centrally therethrough. The hook 60 is installed into one end of the EPDM rubber strap while the opposite end of the bungee strap 54 is mounted in the respective housing frame 40 molded to the top surface 22 of the base 12 of the wheeled platform. A push pin 66 is placed through the hole 48 of each radially extending walls 42, 46 of the housing frame 40, as well as through the hole 64 of the rectangular enlarged terminal end portion 62 at one end of the bungee cord 54 to secure one end of the bungee cord 54 to the base 12 of the wheeled platform.

The opposite end of the link member 58 is provided with a reverse bend hook 60 also, but of a larger radius, so that the two ends of the link member 58 face each other but are also offset from one another. Further, the end of the reverse bend hook of the opposite end of the link member has an additional offset which is created by a bend of the end in the outward direction. To the terminating end of the outward bend of the link member 58 is mounted an axle cap nut 70 after the link member 58 is placed through the hole 56 in the skirt 50 of the bucket which is retained to the end of the link member by the interference fingers of the axle cap nut 70.

With one end of the bungee strap 54 secured into the housing frame 40 on the top surface 22 of the base 12 on both sides of the wheeled platform, the bungee cords 54 are each resiliently extended and the opposite end of the link 58 is placed in the small hole 56 that is drilled into the upper part of the top ledge of the skirt 50 of the bucket wall along each side of each of the buckets 16. The axle cap nut 70 is thereafter placed on the end of the link 58. With a bungee cord 54 that is properly sized for the distance between the base 12 of the wheeled platform and the hole 56 in the skirt 50 of the bucket wall, a biasing force is applied by the resiliency of the bungee cord 54 so that the bungee cord 54, as so installed, will prevent the bucket 16 from being unstable when filled with a heavy load such as sand, water, cement, or dry wall spackling compound. Also when it is necessary to lift the wheeled platform base 12 for any reason, the handle 52 of either of the buckets can now be used to lift the bucket 16 and the wheeled platform 12 will lift with the buckets 16 so that the complete assembly can be carried up the stairs, over an impediment, or over uneven terrain, etc.

Figure 2:
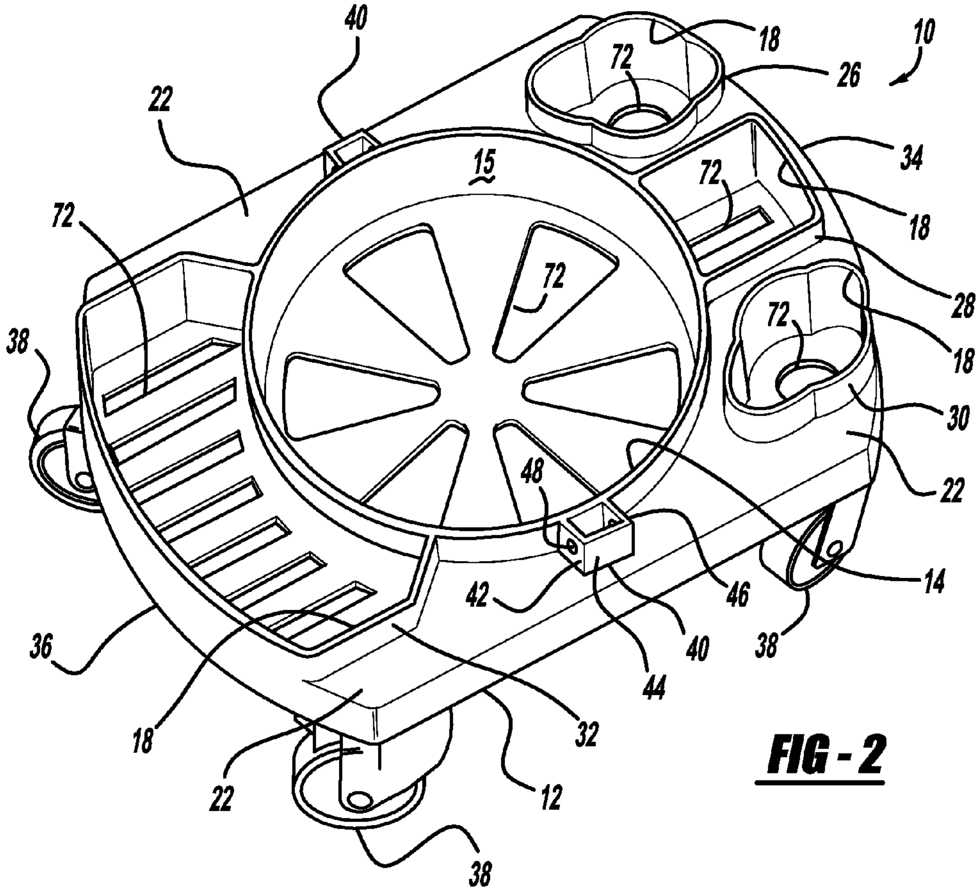
FIG. 2 is a perspective view of the preferred embodiment of the invention.
Figure 3:
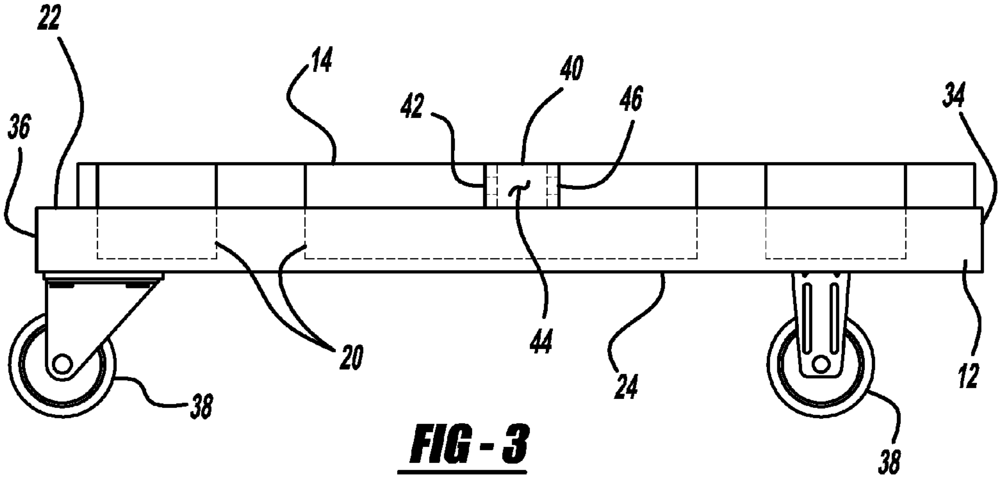
FIG. 3 is a side elevation view of the invention as shown in FIG. 2.
Figure 4:
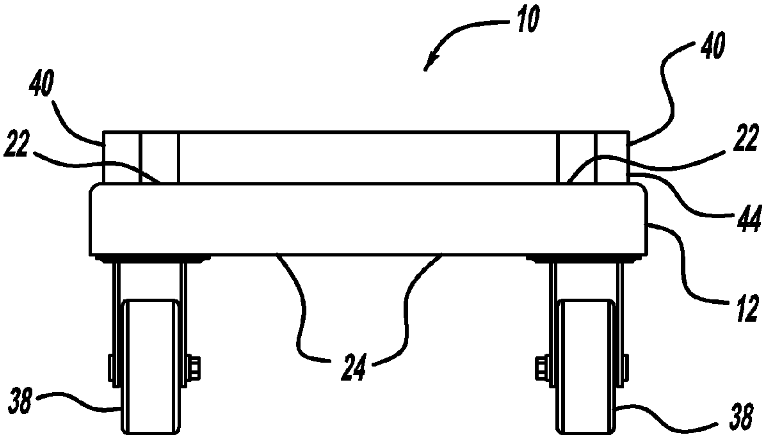
FIG. 4 is an end view of the mobile platform dolly shown in FIG. 2.
Figure 5:
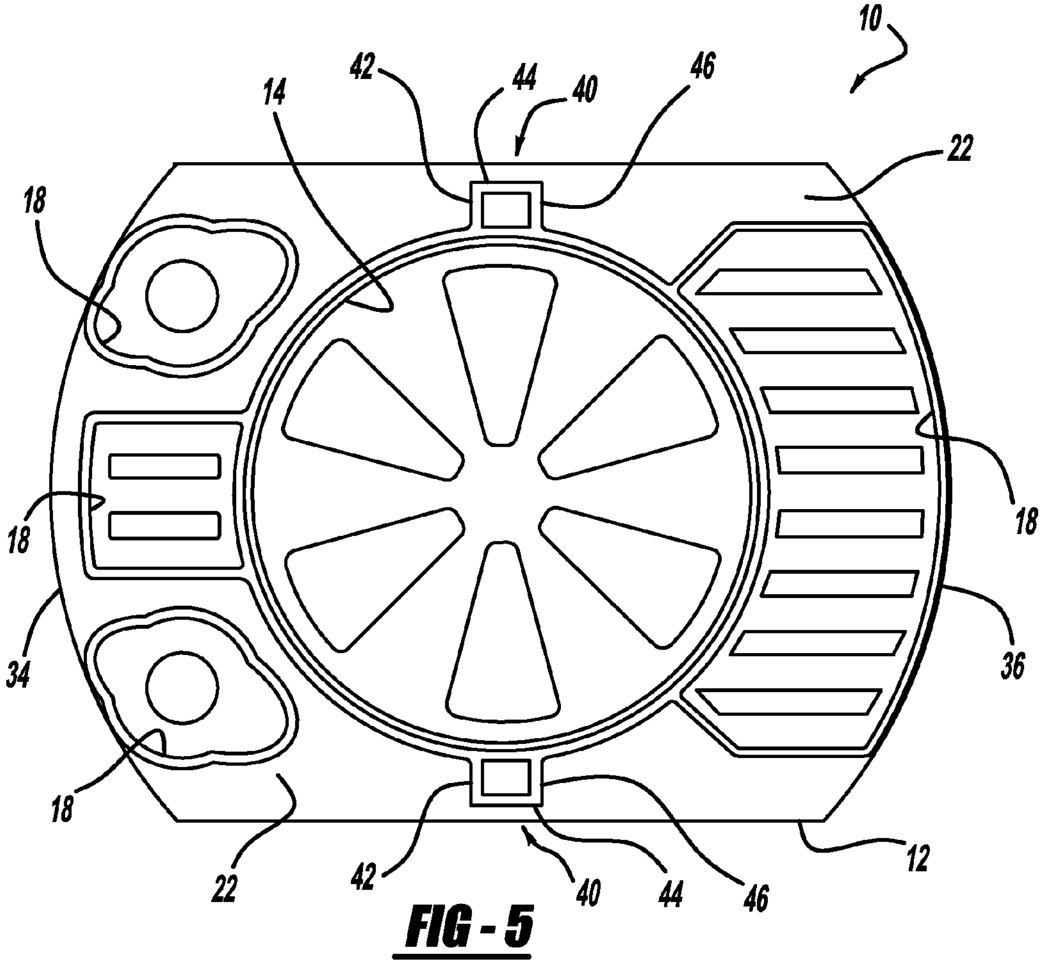
FIG. 5 is a plan view of the mobile platform dolly shown in FIG. 2.

As can be seen in FIG. 2, the lower surface 24 in each of the cylindrical flange compartments 18 have through holes 72 so that spills of liquid or powder material will not accumulate in the bucket compartment and interfere with the bucket installation.

Figure 8:
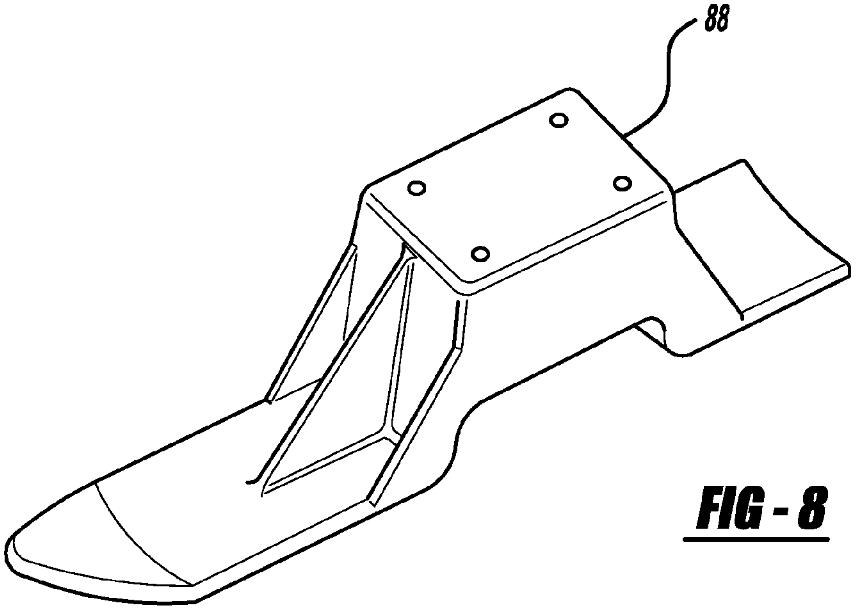
FIG. 8 is a perspective view of a small ski that takes the place of a caster wheel so as to adapt the invention for use by an ice fisherman.

FIG. 8 illustrates a further variant of the wheeled platform and associated bucket. In FIG. 8 each of the caster wheels 38 have been removed from the bottom of the platform and replaced with small ski runners 88 for use by the ice fisherman. The wheeled platform base 12 with attached ski runners 88 is used to convey fishing gear from a vehicle to and from an ice shanty located at the fishing site. The storage platform and bucket arrangement is used to carry an ice auger and a tip up fishing rig. The smaller compartments 18 can be used to store miscellaneous fishing equipment which are cumbersome to carry and often require several trips from the fishing site to and from the vehicle. For obvious reasons the bottom surface of the base in each compartment is provided with through holes 72 as shown in FIG. 2 so liquid that could develop as a result of ice accumulation can melt and run off through the through holes 72 in the bottom surface 24 of the base 12 of the wheeled platform.

From the foregoing, it will be seen that the invention is one well adapted to obtain all the objects herein set forth, together with other advantages which are obvious and which are inherent to the structure.

It will be understood that certain features and sub-combinations are of utility and may be employed without reference to other features and sub-combinations. This is contemplated by and well within the scope of the claims. Although several embodiments have been shown in the drawings, may other embodiments may be made of the invention without departing from the scope thereof. It is to be understood that all matter herein set forth shown in the accompanying drawings is to be interpreted as illustrated and not in a limiting sense.

What is claimed is:

1. A mobile platform for supporting and transporting at least one container, said mobile platform comprising:

a base member having an upper surface; an oppositely disposed lower surface; and at least one compartment integrally formed in said base member, said at least one compartment being proximately centrally disposed on said base member for receiving said at least one container;

a plurality of compartments partially surrounding said at least one of said proximately centrally disposed compartment;

at least one upright housing frame member attached to said upper surface of said base member, said at least one upright housing frame member further being mounted alongside said at least one compartment being proximately centrally disposed on said base member;

said at least one upright housing frame member basing an aperture therein; and wherein said at least one container further comprises a radially extending downwardly projecting skirt having an aperture therein near the open end of said at least one container;

a resilient means comprising a biasing member bar removably coupling said at least one container to said base member, said biasing member having one end attached to said aperture in said at least one upright housing frame and an opposite end attached to said aperture in said skirt along said outer wall of said at least one container such that said biasing member when attached to said aperture in said upright frame member at one end and to said aperture in said skirt along said at least one container wall near said open end at said opposite end generates a biasing force on said at least one container to maintain said at least one container securely mounted in said at least one compartment proximately centrally disposed on said base member; and means for conveying said mobile platform over a horizontal surface.

2. The mobile platform for supporting and transporting at least one container as claimed in claim 1 wherein each compartment of said at least one proximately centrally disposed compartment and each of said plurality of compartments further comprises a peripheral outer flange extending above said upper surface of said base member.

3. The mobile platform for supporting and transporting at least one container as claimed in claim 1 wherein said means for conveying said mobile platform further comprises a plurality of wheels disposed underneath said lower surface of said base member for convoying said base member along a ground surface; and means for attaching said plurality of wheels to said base member.

4. The mobile platform for supporting and transporting at least one container a claimed in claim 1 wherein said at least one proximately centrally disposed compartment and each of said plurality of compartments has a bottom surface integrally molded with said base member.

5. The mobile platform for supporting and transporting at least one container as claimed in claim 4 wherein said bottom surface has at least one opening therein such that a liquid can drain from said at least one proximately centrally disposed compartment and each of said plurality of compartments.

6. The mobile platform for supporting and transporting at least one container as claimed in claim 1 wherein said biasing member further comprises a bungee cord and means for mounting said bungee cord to said base member and said at least one container.

7. The mobile platform for supporting and transporting at least one container as claimed in claim 6 wherein said means for conveying said mobile platform further comprises a plurality of wheels disposed underneath said lower surface of said base member for conveying said base member along a ground surface; and means for attaching said plurality of wheels to said base member.

8. The mobile platform for supporting and transporting at least one container as claimed in claim 1 wherein said means for conveying said mobile platform further comprises a plurality of ski runners disposed underneath said lower surface of said base member for conveying said base member along a frozen ice surface; and means for attaching said plurality of ski runners to said lower surface of said base member.

* * * * *

UNITED STATES PATENT AND TRADEMARK OFFICE

CERTIFICATE OF CORRECTION

PATENT NO. : 8,376,376 B2
APPLICATION NO. : 12/481013
DATED : February 19, 2013
INVENTOR(S) : Richard R. Thibault It is certified that error appears in the above-identified patent and that said Letters Patent is hereby corrected as shown below:

In the Claims:

Column 10, line 51, “said at least one upright housing frame member basing an” should read:
-- said at least one upright housing frame member having an --.

Column 10, line 57, “a resilient means comprising a biasing member bar remov-” should read:
-- a resilient means comprising a biasing member for remov- --.

Signed and Sealed this
Fourteenth Day of May, 2013

Teresa Stanek Rea
*Acting Director of the United States Patent and Trademark Office*